United States Patent
Hanazawa et al.

[11] Patent Number: 6,066,711
[45] Date of Patent: May 23, 2000

[54] POLYESTER POLYMER AND ITS MOLDINGS

[75] Inventors: Makoto Hanazawa, Suita; Michiaki Fuji, Kyoto; Kazuo Sakurai, Himeji; Kenji Yao, Osaka, all of Japan

[73] Assignee: Kanebo, Ltd., Tokyo, Japan

[21] Appl. No.: 09/128,907

[22] Filed: Aug. 4, 1998

[51] Int. Cl.⁷ .................................................. C08G 63/00
[52] U.S. Cl. ............................ 528/176; 528/190; 528/193
[58] Field of Search ..................................... 528/176, 190, 528/193

[56] References Cited

U.S. PATENT DOCUMENTS 5,530,086  6/1996  Fuji et al. ................................ 528/193

*Primary Examiner*—Terressa Mosley
*Attorney, Agent, or Firm*—Graham & James LLP

[57] ABSTRACT

A polyester polymer includes a dicarboxylic acid or its ester-forming derivative and a dihydroxy compound, in which the dicarboxylic acid contains an alicyclic dicarboxylic acid and optionally an aromatic dicarboxylic acid, and the dihydroxy compound contains a compound of formula (1):

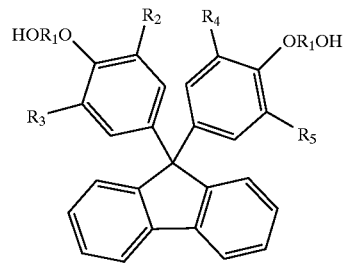

(1)

wherein $R_1$ represents a $C_{1-4}$ alkylene group; and $R_2$, $R_3$, $R_4$ and $R_5$ each represents a hydrogen atom, a $C_{1-4}$ alkyl group, an aryl group or an aralkyl group which may be the same or different. Also, polyester moldings of disc substrates, lenses, sheets, films, tubes or fibers are produced by molding the polyester polymer. The polyester polymer has excellent transparency, excellent heat resistance, extremely low optical anisotropy and excellent moldability.

23 Claims, 1 Drawing Sheet

POLYESTER POLYMER AND ITS MOLDINGS

FIELD OF THE INVENTION

The present invention relates to a polyester polymer and its moldings. More precisely, the present invention relates to a polyester polymer and modlings thereof, which polymer has excellent transparency, excellent heat resistance, extremely low optical anisotropy and excellent moldability, and which is therefore a material favorable not only for engineering plastics but also especially for optical instruments.

BACKGROUND OF THE INVENTION

Transparent resins with good mechanical characteristics have been used frequently as optical materials for engineering plastics. For example, polymethyl methacrylate (hereinafter referred to as PMMA) and polycarbonate (hereinafter referred to as PC) are used as optical materials for compact discs, laser discs, lenses, etc., and also as transparent parts of automobiles. PMMA has the advantage of good transparency and small optical anisotropy, but is disadvantageous in that it is highly hygroscopic. Therefore, moldings of PMMA are often deformed and have poor shape stability. On the other hand, PC has the advantage of good transparency and good heat resistance, but is disadvantageous in that its fluidity is low and therefore, the birefringence of its moldings is often large. For those reasons, PMMA and PC are not satisfactory for use as optical materials. The recent development of optical discs for recording and reproducing various information such as sounds, images and letters by the use of laser rays is advancing such that substrate materials having optical characteristics of higher quality are desired.

Using polyester copolymers as optical materials was proposed (see Japanese Patent Publication (JP-B) Sho-57-20864, Sho-2-98845 and Hei-2-38428), but the resins proposed are not always satisfactory as their optical characteristics are often not good.

In JP-B Hei-3-168211, various polyester resins comprising 9,9-bis(4-hydroxyphenyl)fluorene, 2,2-bis(4-hydroxyphenyl)propane, terephthalic acid and isophthalic acid were described as having a glass transition point which is sufficiently high and that an optical anisotropy of oriented films of such resins is small.

In U.S. Pat. No. 3,546,165, the production of a polymer of 9,9-bis(4-hydroxyphenyl)fluorene, terephthalic acid and isophthalic acid in an acid chloride method is described. As an improvement to the polymer, a heat-resistant polyester comprising 9,9-bis(4-hydroxyphenyl)fluorene, terephthalic acid, isophthalic acid and a fatty acid in a specific ratio is disclosed.

However, all of the known polymers described above comprise 9,9-bis(4-hydroxyphenyl)fluorene, which requires special conditions for polymerization thereof. Specifically, since 9,9-bis(4-hydroxyphenyl)fluorene has a phenolic group at both terminals, being different from aliphatic alcohols, it is extremely difficult for it to react. Therefore, it requires reaction conditions at higher temperatures in its melt polymerization, in which, however, the polymer formed is easily pyrolyzed, colored and deteriorated. In addition, when the monomer is polymerized with a dicarboxylic acid in a method where the dicarboxylic acid is previously converted into an acid chloride thereof at its terminal groups and is thereafter polymerized with the monomer in a solvent while removing hydrochloric acid formed, it is difficult to obtain a uniform reaction therebetween, resulting in the polymer formed having a wide molecular weight distribution. Moreover, the polymerization of the monomer in question requires a large amount of a catalyst compound, and the post-treatment of the catalyst used is troublesome. Thus, the method of polymerizing the monomer is complicated and is expensive. Further, despite various improvements to the polymerization of the monomer, the polymer formed has too high of a glass transition point and its moldability is still unsatisfactory. As a result, for example, injection molding of the polymer is difficult.

SUMMARY OF THE INVENTION

To overcome the problems described above, the preferred embodiments of the present invention provide a novel polyester polymer and moldings thereof which have excellent transparency, excellent mechanical characteristics, excellent electric characteristics, extremely low optical anisotropy, excellent moldability and excellent dimension stability, and which polyester polymer is therefore suitable for engineering plastics, especially optical materials. The polyester polymer also has the advantage of easy and inexpensive industrial production and manufacture.

The preferred embodiments of the present invention provide a polyester polymer comprising a dicarboxylic acid or its ester-forming derivative and a dihydroxy compound, in which the dicarboxylic acid contains an alicyclic dicarboxylic acid, and the dihydroxy compound contains a compound of the following general formula (1), and also provide polyester moldings to be produced by molding the polyester polymer.

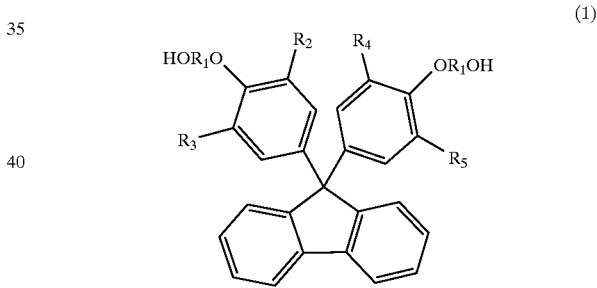

(1)

wherein $R_1$ represents an alkylene group having from 2 to 4 carbon atoms; and $R_2$, $R_3$, $R_4$ and $R_5$ each represents a hydrogen atom, an alkyl group having from 1 to 4 carbon atoms, an aryl group or an aralkyl group which may be the same or different.

The preferred embodiments of the present invention also provide a polyester polymer comprising a dicarboxylic acid or its ester-forming derivative and a dihydroxy compound in which the dicarboxylic acid contains an alicyclic dicarboxylic acid and an aromatic dicarboxylic acid, and the dihydroxy compound contains a compound of formula (1) noted above, and also provide polyester moldings to be produced by molding the polyester polymer.

The alicyclic dicarboxylic acid is preferably at least one compound selected from cyclohexane-dicarboxylic acid, decalin-dicarboxylic acid, norbornane-dicarboxylic acid, adamantane-dicarboxylic acid and tricyclodecene-dicarboxylic acid.

The aromatic dicarboxylic acid is preferably selected from terephthalic acid, isophthalic acid and their ester-forming derivatives.

The dihydroxy compound of formula (1) is preferably 9,9-bis[4-(2-hydroxyethoxy)phenyl]fluorene.

The polyester moldings according to preferred embodiments of the present invention include disc substrates, lenses, sheets, films, tubes and fibers as produced by molding the novel polyester polymer.

DETAILED DESCRIPTION OF PREFERRED EMBODIMENTS

Figure 1:
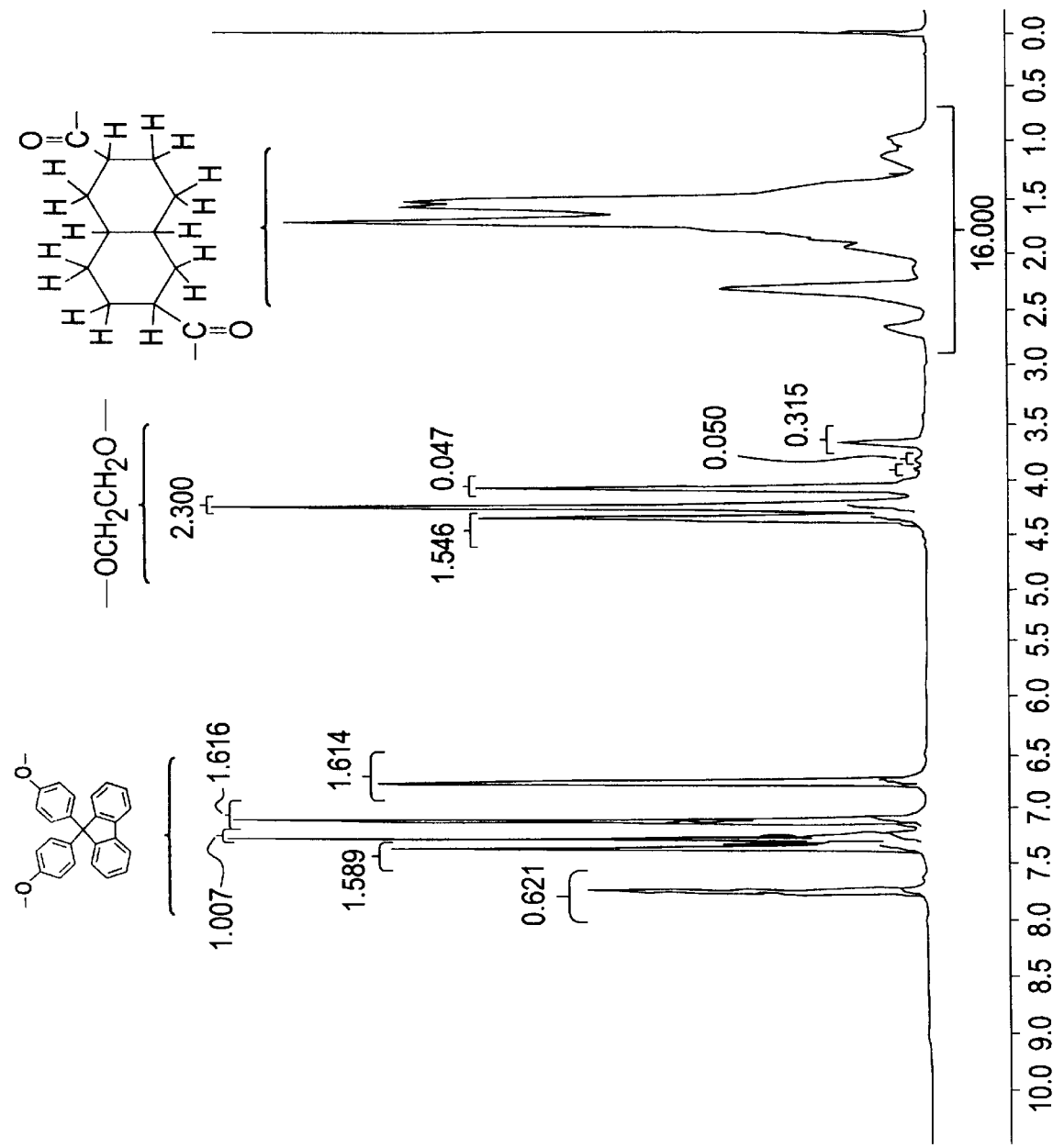
FIG. 1 is an NMR spectral pattern of the sample obtained in Example 1 of the invention.

The polyester polymer according to preferred embodiments of the present invention includes a dicarboxylic acid or its ester-forming derivative and a dihydroxy compound, in which the dicarboxylic acid contains an alicyclic dicarboxylic acid, or contains an alicyclic dicarboxylic acid and an aromatic dicarboxylic acid, and the dihydroxy compound contains a compound of the following general formula (1):

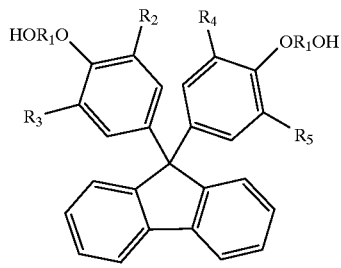

(1)

wherein $R_1$ represents an alkylene group having from 2 to 4 carbon atoms; and $R_2$, $R_3$, $R_4$ and $R_5$ each represents a hydrogen atom, an alkyl group having from 1 to 4 carbon atoms, an aryl group or an aralkyl group which may be the same or different.

Preferably, the polyester polymer of the preferred embodiments of the present invention preferably has a glass transition point (Tg) falling between about 80° C. and about 150° C., more preferably between about 100° C. and about 150° C., in view of the fluidity of its melt and the heat resistance of the moldings of the polymer.

The preferred embodiments of the present invention, in which a dihydroxy compound of formula (1) along with a comonomer component comprising an alicyclic dicarboxylic acid and optionally an aromatic dicarboxylic acid is used, has enabled production of a polyethylene terephthalate resin which has lowered optical anisotropy but still has excellent moldability.

The reason why the optical anisotropy of the polymer of the preferred embodiments of the present invention is lowered is because of the particular molecular structure of the polymer, or that is, because of its structure where the fluorene group is positioned in the plane vertical to the direction of the main chain having two phenol groups. In general, it is known that the presence of an aromatic dicarboxylic acid moiety of, for example, terephthalic acid, isophthalic acid or the like in the direction of the main chain of a polyester improves the heat resistance of the polymer, but causes an increase in the optical anisotropy of the polymer. Therefore, it is possible to lower the optical anisotropy of a polyester by reducing the aromatic dicarboxylic acid component in the polymer while substituting the component therein with an aliphatic dicarboxylic acid or an alicyclic dicarboxylic acid. The degree of optical anisotropy of a polymer material can be determined by measuring the birefringence of a molding of the material. The birefringence of the moldings of the polyester polymer of preferred embodiments of the present invention is nearly 0 (zero). This is an important requirement for forming the polymer into high-density recording media of optical disc substrates, especially photomagnetic discs, resulting in that the C/N ratio (where C indicates a carrier of a recording signal, and N indicates a noise) of the recording media formed from the polymer could be large.

As has been mentioned hereinabove, the glass transition point of the polyester polymer of preferred embodiments of the present invention preferably falls between about 80° C. and about 150° C., more preferably between about 100° C. and about 150° C. However, if the aliphatic moiety of the polymer is linear and if the linear aliphatic content of the polymer is large, the glass transition point of the polymer is lowered so as to be lower than about 80° C. If so, the moldings of the polymer will be easily deformed even at temperatures falling within a room temperature range. In the preferred embodiments of the present invention, an alicyclic dicarboxylic acid having a stiff structure is used as one monomer component, whereby the polymer obtained may have an increased glass transition point.

The alicyclic dicarboxylic acid for use in the polyester polymer of preferred embodiments of the present invention includes, for example, monocyclic alicyclic dicarboxylic acids such as cyclohexane-dicarboxylic acids of the following general formula (2); and polycyclic alicyclic dicarboxylic acids such as decalin-dicarboxylic acids of the following formulae (3) and (4), norbornane-dicarboxylic acids of the following general formulae (5) and (6), adamantane-dicarboxylic acids of the following general formulae (7) and (8), and tricyclodecene-dicarboxylic acids of the following general formulae (9), (10) and (11).

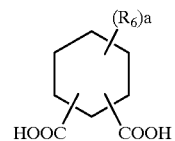

(2)

wherein $R_6$ represents a hydrogen atom, or an alkyl, aryl or aralkyl group having from 1 to 7 carbon atoms, and plural $R_6$'s, if any, may be the same or different; and a represents a natural number of from 1 to 3.

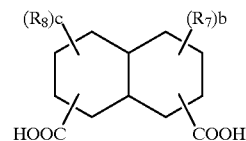

(3)

wherein $R_7$ and $R_8$ each represents a hydrogen atom, or an alkyl, aryl or aralkyl group having from 1 to 7 carbon atoms, and these may be the same or different; and b and c each represents a natural number of from 1 to 7.

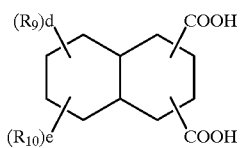
(4)

wherein $R_9$ and $R_{10}$ each represents a hydrogen atom, or an alkyl, aryl or aralkyl group having from 1 to 7 carbon atoms, and these may be the same or different; and d and e each represents a natural number of from 1 to 7.

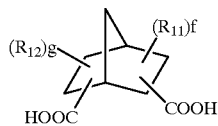
(5)

wherein $R_{11}$ and $R_{12}$ each represents a hydrogen atom, or an alkyl, aryl or aralkyl group having from 1 to 7 carbon atoms, and these may be the same or different; and f and g each represents a natural number of from 1 to 7.

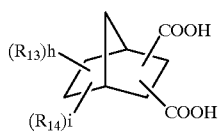
(6)

wherein $R_{13}$ and $R_{14}$ each represents a hydrogen atom, or an alkyl, aryl or aralkyl group having from 1 to 7 carbon atoms, and these may be the same or different; and h and i each represents a natural number of from 1 to 7.

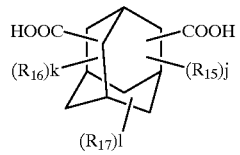
(7)

wherein $R_{15}$, $R_{16}$ and $R_{17}$ each represents a hydrogen atom, or an alkyl, aryl or aralkyl group having from 1 to 7 carbon atoms, and these may be the same or different; j and k each represents a natural number of from 1 to 8; and l represents a natural number of from 1 to 9.

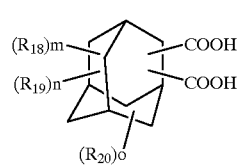
(8)

wherein $R_{18}$, $R_{19}$ and $R_{20}$ each represents a hydrogen atom, or an alkyl, aryl or aralkyl group having from 1 to 7 carbon atoms, and these may be the same or different; m and n each represents a natural number of from 1 to 8; and o represents a natural number of from 1 to 9.

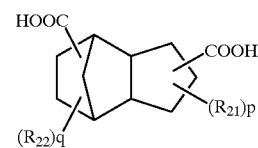
(9)

wherein $R_{21}$ and $R_{22}$ each represents a hydrogen atom, or an alkyl, aryl or aralkyl group having from 1 to 7 carbon atoms, and these may be the same or different; and p and q each represents a natural number of from 1 to 7.

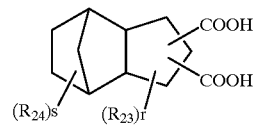
(10)

wherein $R_{23}$ and $R_{24}$ each represents a hydrogen atom, or an alkyl, aryl or aralkyl group having from 1 to 7 carbon atoms, and these may be the same or different; and r and s each represents a natural number of from 1 to 7

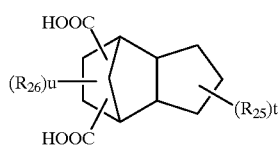
(11)

wherein $R_{25}$ and $R_{26}$ each represents a hydrogen atom, or an alkyl, aryl or aralkyl group having from 1 to 7 carbon atoms, and these may be the same or different; and t and u each represents a natural number of from 1 to 8.

Ester-forming derivatives of those alicyclic dicarboxylic acids may be any ones generally used in producing polyesters, and include, for example, alkyl esters, such as dimethyl esters and diethyl esters, of the acids.

One or more of these alicyclic dicarboxylic acids and their ester-forming derivatives may be used either alone or as combined, if necessary.

Of those alicyclic dicarboxylic acids, a preferred one is 2,6-decalin-dicarboxylic acid, since the acid is easy to produce and since the polymer comprising the acid is easy to mold and has excellent optical characteristics. However, the acid is not limited to this preferred one.

The alicyclic dicarboxylic acid and its ester-forming derivative may be provided in any desired amount falling within a range of from about 1 mol % to about 99 mol %, relative to the entire dicarboxylic acid component of about 100 mol % in the polymer of the preferred embodiments of the present invention. This compositional ratio may vary, depending on the desired resin and on the use of the resin, but is preferably such that the alicyclic dicarboxylic acid and its ester-forming derivative is provided in an amount falling within a range of from about 20 mol % to about 99 mol %, more preferably from about 30 mol % to about 99 mol %, even more preferably from about 50 mol % to about 99 mol %. Where the acid and its derivative are combined with a polycyclic aromatic dicarboxylic acid and/or a biphenyldicarboxylic acid in order to further increase the heat resistance of the polymer, the additional acids are preferably provided in an amount of not larger than about 50 mol % each so as not to increase the birefringence of the polymer.

Other dicarboxylic acids are capable of being used herein, which acids include, for example, aliphatic dicarboxylic acids such as malonic acid, succinic acid, glutaric acid, adipic acid, pimelic acid, suberic acid, azelaic acid, methylmalonic acid, ethylmalonic acid, etc.; monocyclic aromatic dicarboxylic acids such as terephthalic acid, isophthalic acid, etc.; naphthalene-dicarboxylic acids such as 2,6-naphthalene-dicarboxylic acid, 1,8-naphthalene-dicarboxylic acid, etc.; polycyclic aromatic dicarboxylic acids such as anthracene-dicarboxylic acid, phenanthrene-dicarboxylic acid, etc.; and biphenyldicarboxylic acids such as 2,2'-biphenyldicarboxylic acid, etc.

Dihydroxy compounds of formula (1) for use in preferred embodiments of the present invention include, for example, the following:

9,9-bis[4-(2-hydroxyethoxy)phenyl]fluorene,
9,9-bis[4-(2-hydroxyethoxy)-3-methylphenyl]fluorene,
9,9-bis[4-(2-hydroxyethoxy)-3,5-dimethylphenyl]fluorene,
9,9-bis[4-(2-hydroxyethoxy)-3-ethylphenyl]fluorene,
9,9-bis[4-(2-hydroxyethoxy)-3,5-diethylphenyl]fluorene,
9,9-bis[4-(2-hydroxyethoxy)-3-propylphenyl]fluorene,
9,9-bis[4-(2-hydroxyethoxy)-3,5-dipropylphenyl]fluorene,
9,9-bis[4-(2-hydroxyethoxy)-3-isopropylphenyl]fluorene,
9,9-bis[4-(2-hydroxyethoxy)-3,5-diisopropylphenyl] fluorene,
9,9-bis[4-(2-hydroxyethoxy)-3-n-butylphenyl]fluorene,
9,9-bis[4-(2-hydroxyethoxy)-3,5-di-n-butylphenyl]fluorene,
9,9-bis[4-(2-hydroxyethoxy)-3-isobutylphenyl]fluorene,
9,9-bis[4-(2-hydroxyethoxy)-3,5-diisobutylphenyl]fluorene,
9,9-bis[4-(2-hydroxyethoxy)-3-(1-methylpropyl)phenyl] fluorene,
9,9-bis[4-(2-hydroxyethoxy)-3,5-bis(1-methylpropyl) phenyl]fluorene,
9,9-bis[4-(2-hydroxyethoxy)-3-phenylphenyl]fluorene,
9,9-bis[4-(2-hydroxyethoxy)-3,5-diphenylphenyl]fluorene,
9,9-bis[4-(2-hydroxyethoxy)-3-benzylphenyl]fluorene,
9,9-bis[4-(2-hydroxyethoxy)-3,5-dibenzylphenyl]fluorene,
9,9-bis[4-(3-hydroxypropoxy)phenyl]fluorene, and
9,9-bis[4-(4-hydroxybutoxy)phenyl]fluorene.

One or more of these compounds may be used either alone or as combined.

Of the compounds identified above, the most preferred is 9,9-bis[4-(2-hydroxyethoxy)phenyl]fluorene because of the moldability of the polymer comprising the compound and because of the optical characteristics of the moldings of the polymer. 9,9-Bis[4-(2-hydroxyethoxy)phenyl]fluorene is obtained, for example, by adding ethylene oxide (hereinafter referred to as EO) to 9,9-bis(4-hydroxyphenyl)fluorene. The reaction product will include 2EO adduct (9,9-bis[4-(2-hydroxyethoxy)phenyl]fluorene) of which the both terminals each have one EO molecule, and impurities of 3EO adduct, 4EO adduct and others having some excessive EO molecules added thereto. In order to obtain polyester polymers have good heat resistance, it is desirable that the purity of the 2EO adduct is not lower than about 85%, more preferably not lower than about 95%.

Where the polyester polymer of preferred embodiments of the present invention is produced through interesterification in melt polymerization, it is desirable that the dihydroxy compound of formula (1) accounts for from about 10 mol % to about 95 mol % of the glycol component constituting the resin. This is because of the advantage that, when the dihydroxy compound content is not larger than about 95 mol %, the melt polymerization is easy and the polymerization time is short. On the other hand, if the dihydroxy compound content is larger than about 95 mol %, the polymer may be produced through solution polymerization or interfacial polymerization within a short period of time. Another advantage is that, when the dihydroxy compound content is not smaller than about 10 mol %, the glass transition point of the resin obtained is high.

Other dihydroxy compounds except those of formula (1) are optionally usable herein, which may be any compounds generally used in the field of plastics. Such other dihydroxy compounds include, for example, aliphatic glycols such as ethylene glycol, 1,3-propanediol, 1,2-propanediol, 1,4-butanediol, 1,2-butanediol, 1,3-butanediol, 1,5-pentanediol, 1,4-pentanediol, 1,3-pentanediol, etc.; alicyclic glycols such as cyclohexane-dimethanol, cyclopentane-dimethanol, etc.; and aromatic diols such as 1,4-benzene-dimethanol, 1,3-benzene-dimethanol, etc. Of these compounds, preferred are ethylene glycol and 1,4-butanediol, but more preferred is ethylene glycol, because of the heat resistance of the polymer formed. One or more of these additional hydroxy compounds may be used either alone or as combined.

Also optionally, at least one of dihydroxy compounds having aromatic ring(s) in the main chain and/or in the side chains, such as 1,1-bis[4-(2 -hydroxyethoxy)phenyl]-1-phenylethane, etc.; compounds having aromatic ring(s) and sulfur atom(s) in the main chain, such as bis[4-(2-hydroxyethoxy)phenyl]sulfone; and other dihydroxy compounds may be combined with the dihydroxy compound of formula (1) in an amount of up to 10 mol % of the entire dihydroxy compound component.

The polyester polymer of the preferred embodiments of the present invention can be produced via any known method of, for example, melt polymerization such as interesterification or direct polymerization, or even solution polymerization or interfacial polymerization. The polymerization catalyst and other reaction conditions for the production of the polymer of the preferred embodiments of the present invention may be suitably selected from known ones.

Where polyester polymers are produced through solution polymerization or interfacial polymerization, acid chlorides are generally used as the active forms of the acid component, and methylene chloride, chloroform or the like as the solvent. The polymers obtained through such solution polymerization shall contain chlorides as the side products and even catalyst compounds used. Such impurities remaining in the polymers worsen the operability of the polymers in forming the polymers into sheets, films, plates, fibers and others and worsen the quality of the resulting products. For example, in the step of heating the polymers at high temperatures, the impurities are often greatly pyrolyzed. Where the polymers are used as optical materials, thin metal films such as reflective films or recording films are formed on the substrates of the polymers through vapor deposition or sputtering. In such a case, if a large amount of a chlorine-containing component exists in the polymers, it will corrode the reflective films and the recording films formed on the polymer substrates, whereby the life of the products will be shortened and the reliability thereof will be lowered. Accordingly, after the polymerization step, it is desirable that the polymers formed are fully washed and filtered to remove the impurities therefrom.

The polyester polymer of preferred embodiments of the present invention is preferably produced through melt polymerization. This is because the properties of 9,9-bis[4-(2-hydroxyethoxy)phenyl]fluorene compounds for use in the preferred embodiments of the present invention are similar to those of aliphatic glycols with respect to their terminal groups, and the compounds have high reactivity, being significantly different from 9,9-bis(4-hydroxyphenyl) fluorene. Therefore, in producing the polymer according to preferred embodiments of the present invention, it is unnecessary to use acid chlorides and similar reactive derivatives as the starting compounds. The polymer of the preferred embodiments of the present invention can be produced in such melt polymerization where the polymer produced is not substantially contaminated with chlorine. In addition, in the melt polymerization, the monomers can be reacted at high temperatures and the amount of the catalyst to be used can be reduced. As a result, the polymer thus produced shall have a reduced amount of impurities.

The polyester polymer of preferred embodiments of the present invention may be mixed with a lubricant, a heat-resisting agent, an antistatic agent, an ultraviolet absorbent, a pigment, etc., depending on the products to be formed from it.

Where the polyester polymer of preferred embodiments of the present invention is used as an optical material, special attention should be paid throughout the step of feeding starting compounds into a reactor, the step of polymerizing the compounds, the step of pelletizing the resulting polymer, and the step of molding the pellets into sheets or films through injection molding, so that the polymer is not contaminated with dust. In general, where the polymer is formed into compact discs (hereinafter referred to as CD), its dust level is desirably not higher than class 1000; and where the polymer is used for forming recording media of higher levels, its dust level is desirably not higher than class 100.

Being amorphous, the polyester polymer of preferred embodiments of the present invention has excellent transparency; and because of having excellent melt viscoelasticity characteristics, the polymer is easy to mold. In particular, the polymer is characterized in that, while being molded, residual stress and strain in the moldings remains negligible and molecular orientation hardly occurs therein, and that the moldings of the polymer have extremely low optical anisotropy even if such stress or orientation remains or occurs therein. For these reasons, the polyester polymer of the preferred embodiments of the present invention is favorably used in transparent materials and optical materials.

The polyester moldings of the preferred embodiments of the present invention can be obtained by molding the polyester polymer of the preferred embodiments of the present invention in any known method of, for example, injection molding, injection compression molding, transfer molding, blow molding, extrusion molding, pressure molding, casting and the like. To mold the polymer, any desired method can be selected from the known molding methods. For example, for forming the polymer into optical disc substrates, lenses and other ordinary moldings, the polymer injection molding or injection compression molding is preferred. For forming the polymer into films, sheets, optical fibers, and other fibrous moldings, extrusion molding is preferred. For forming the polymer into bottles, bags and the like, blow molding is preferred. For forming the polymer into patterned moldings, pressure molding or transfer molding is preferred. Especially preferred is injection compression molding or extrusion molding for producing moldings that require the excellent characteristics of the polyester polymer of the preferred embodiments of the present invention, such as excellent transparency, low optical anisotropy and excellent heat resistance thereof, or that is, for producing moldings for optical use.

To produce optical disc substrates according to one preferred embodiment of moldings for optical use, injection compression molding is preferred, for which the molding conditions such as the resin temperature, the mold temperature and the pressure to be kept in molds are appropriately defined to thereby make the disc substrates produced have small birefringence. The disc substrates thus produced are not warped and the birefringence in the radial direction, the thickness and the transferability are all well unified. The preferred molding conditions could not be indiscriminately defined, as varying depending on the composition and the degree of polymerization of the polymer to be molded. In general, however, the mold temperature is preferably near the glass transition point of the polymer, which may fall between about 80° C. and about 150° C. The resin temperature preferably falls between about 240° C. and about 320° C. If the resin temperature is lower than about 240° C., the fluidity and the transferability of the resin will be poor, unfavorably resulting in that the moldings obtained having stress and strain remaining therein and having large birefringence. If, on the contrary, the resin temperature is higher than about 320° C., the resin being molded will be pyrolyzed, unfavorably resulting in that the strength of the moldings formed being low, the moldings being colored, the mirror surface of the mold used and the stamper used being soiled and the releasability of the moldings being poor.

To produce plastic lenses according to another preferred embodiment of moldings for optical use, an injection compression molding, compression molding, vacuum molding or a similar molding process is preferably used. In view of its industrial mass-producibility, especially preferred is injection compression molding, for which the molding conditions such as the resin temperature, the mold temperature and the pressure to be kept in molds are appropriately defined to thereby make the plastic lenses produced have small optical strain. The preferred molding conditions could not be indiscriminately defined, as varying depending on the composition and the degree of polymerization of the polymer to be molded. In general, however, it is desirable that the molding temperature falls between about 240° C. and about 320° C., and that the mold temperature is substantially the same as the glass transition point of the polymer being molded or may be lower than the glass transition temperature of the polymer by about 20° C., which may fall between about 60° C. and about 150° C. The accuracy of plastic lenses molded is indicated by the dimension accuracy and the surface characteristics thereof, and if the accuracy to be indicated by such is low, the plastic lenses shall have large optical strain. However, where the resin of preferred embodiments of the present invention is molded under the condition defined above, it is easy to obtain plastic lenses having small optical strain.

Now, preferred embodiments of the present invention are described concretely with reference to the following Examples, which, however, are not intended to restrict the scope of the invention. The glass transition point, the birefringence and the NMR data of the polymers prepared in the Examples were measured according to the methods mentioned below.

1. Glass Transition Point:

Using a differential scanning calorimeter (Rigaku Denki's DSC-8230 Model), about 10 mg of a sample was heated at a heating rate of 10° C./min, and its glass transition point, Tg, was measured according to JIS K 7121-1987.

2. Birefringence:

Using a Carl-Zeiss's polarizing microscope to which had been fitted a compensator, the birefringence of a resin piece was measured by applying thereto a monochromatic ray of 546 nm. The resin piece was prepared as follows: A resin sample was melted at a temperature falling between 240 and 300° C. and molded through extrusion molding into discs having a diameter of 30 mm and a thickness of 1 mm. Then, each disc was press-molded at a temperature falling between 160 and 240° C. into a film having a thickness of from 80 to 150 µm. This film was cut into test pieces having a size of 4×40 mm. The test pieces were drawn by 40% at a drawing rate of 20%/sec, and then rapidly cooled to obtain dram films. The birefringence of each drawn film was measured in the manner noted above.

3. NMR:

A sample was dissolved in chloroform deuteride. Using a Varian's FT-NMR device (300 MHz) and using tetramethylsilane therein as a standard, the proton NMR spectrum of the sample was measured.

EXAMPLE 1

Starting materials of dimethyl 2,6-decalin-dicarboxylate (1 mol), 9,9-bis[4-(2-hydroxyethoxy)phenyl]fluorene (0.4 mols) and ethylene glycol (2.2 mols) were put into a reactor along with catalysts of calcium acetate (0.0008 mols) and manganese acetate (0.0002 mols), and gradually heated from 190° C. up to 245° C. in an ordinary manner with stirring them to attain interesterification. After a predetermined amount of methanol was discharged out of the system, a polymerization catalyst of germanium oxide (0.012 mols) and a coloration inhibitor of trimethyl phosphate (0.0018 mols) were put into the reactor, which was then gradually heated wihile gradually lowering the inner pressure and while discharging therefrom ethylene glycol formed, whereby the temperature of the reactor reached 290° C. and the vacuum degree thereof reached 1 Torr or lower. The reaction system was kept under this condition whereupon its viscosity increased. After the viscosity reached a predetermined stirring torque (that is, after about 2 hours), the reaction was terminated, and the reaction mixture was extruded into water to obtain pellets.

The resin pellets were melt-extruded at 270° C. to obtain disc samples. Each sample was pressed at 190° C. into a film having a thickness of 100 µm. This was drawn at 131° C., and the drawn film was found to have a birefringence of $+7 \times 10^{-4}$. The NMR spectral pattern of the sample of Example 1 is shown in FIG. 1.

EXAMPLES 2 TO 4

Resin pellets were prepared in the same manner as in Example 1, except that the compositional ratio of the starting materials was changed as in Table 1 below. These were processed and evaluated in the same manner as in Example 1. The data obtained are shown in Table 1. All the samples obtained herein were uniform and transparent.

EXAMPLES 5 AND 6

Resin pellets were prepared in the same manner as in Example 1, except that dimethyl 2,6-decalin-dicarboxylate (0.5 mols) and dimethyl terephthalate (0.5 mols) were used in place of dimethyl 2,6-decalin-dicarboxylate (1 mol) and that the compositional ratio of the dihydroxy compounds was changed as in Table 1. These were processed and evaluated in the same manner as in Example 1. The data obtained are shown in Table 1. All the samples obtained herein were uniform and transparent.

EXAMPLES 7 AND 8

Resin pellets were prepared in the same manner as in Example 1, except that the compositional ratio of the starting materials was changed as in Table 1. These were processed and evaluated in the same manner as in Example 1. The data obtained are shown in Table 1. All the samples obtained herein were uniform and transparent.

COMPARISON 1

Resin pellets were prepared in the same manner as in Example 1, except that the dicarboxylic acid component as in Table 1 was used and that ethylene glycol (2.2 mols), calcium acetate (0.0008 mols), germanium oxide (0.0024 mols) and trimethyl phosphate (0.0036 mols) were used relative to 1 mol of the dicarboxylic acid component. The polymer obtained herein was evaluated, and its data are shown in Table 1. As in Table 1, the polymer has a low Tg and has poor heat resistance, and it has a large birefringence. It is known that the polymer is not suitable to optical use.

COMPARISON 2

Resin pellets were prepared in the same manner as in Example 1, except that dimethyl terephthalate (1 mol), ethylene glycol (2.2 mols), calcium acetate (0.0008 mols), germanium oxide (0.0024 mols) and trimethyl phosphate (0.0036 mols) were used as the starting materials and the additives. The polymer obtained herein was evaluated, and its data are shown in Table 1. The birefringence of the film of the polymer could not be measured, as the film was cloudy in white. The polymer could be applied to some special uses, but could not be applied to the optical use to which the present invention is directed and which requires heat resistance and optical transparency.

COMPARISON 3

Resin pellets were prepared in the same manner as in Example 1, except that the dicarboxylic acid as in Table 1 was used and that ethylene glycol (2.2 mols), calcium acetate (0.0008 mols), germanium oxide (0.0024 mols) and trimethyl phosphate (0.0036 mols) were used relative to 1 mol of the dicarboxylic acid. The polymer obtained herein was evaluated, and its data are shown in Table 1. As in Table 1, the polymer has a low Tg and has poor heat resistance, and it has a large birefringence. It is known that the polymer is not suitable to optical use.

As another comparative example, a commercially-available polycarbonate (Mitsubishi Chemical's Novarex AD3) was formed into a film in the same manner as in Example 1, and the birefringence of the film was measured and shown in Table 1.

TABLE 1

| | Amount (mols) | | | | | Glass Transition Point, Tg (°C.) | Birefringence of Drawn Film (×10⁻⁴) |
|---|---|---|---|---|---|---|---|
| | Dicarboxylic Acid Component | | | Dihydroxy Compound Component | | | |
| | Alicyclic | Aromatic | | | | | |
| | (A) | (B) | (C) | (a) | (b) | | |
| Example 1 | 1 | | | 2.2 | 0.4 | 111 | +7 |
| Example 2 | 1 | | | 2.2 | 0.55 | 123 | +7 |
| Example 3 | 1 | | | 2.2 | 0.7 | 133 | +6 |
| Example 4 | 1 | | | 2.2 | 0.95 | 146 | +2 |
| Example 5 | 0.5 | 0.5 | | 2.2 | 0.4 | 115 | +27 |
| Example 6 | 0.5 | 0.5 | | 2.2 | 0.7 | 141 | +15 |
| Example 7 | 1 | | | 2.2 | 0.1 | 80 | +8 |
| Example 8 | 0.7 | | 0.3 | 2.2 | 0.4 | 100 | +10 |
| Comparison 1 | | 0.8 | 0.2 | 2.2 | | 70 | +99 |
| Comparison 2 | | 1 | | 2.2 | | 75 | Unmeasurable |
| Comparison 3 | 0.1 | 0.9 | | 2.2 | 0.4 | 118 | +75 |
| Polycarbonate | | | | | | | −95 |

(A) Dimethyl 2,6-decalin-dicarboxylate
(B) Dimethyl terephthalate
(C) Dimethyl isophthalate
(a) Ethylene glycol
(b) 9,9-Bis[4-(2-hydroxyethoxy)phenyl]fluorene Comparing the samples of the preferred embodiments of the present invention in the Examples with the samples in the Comparisons, it is known that the former are optically transparent and have an extremely small birefringence and that the moldability of the former is much better than that of the latter.

As has been mentioned hereinabove, the polyester polymer of preferred embodiments of the present invention has extremely high transparency, extremely small optical anisotropy and excellent moldability and is molded into moldings having excellent dimension stability and excellent high chemical resistance. The polyester polymer of the preferred embodiments of the present invention has many industrial applications in the field of optical materials, for example, for plastic lenses, optical fibers and optical discs, and also in other various fields of fibers, films, sheets, etc.

While the invention has been described in detail and with reference to specific preferred embodiments thereof, it will be apparent to one skilled in the art that various changes and modifications can be made therein without departing from the spirit and scope thereof.

What is claimed is:

1. A polyester polymer comprising a dicarboxylic acid or its ester-forming derivative and a dihydroxy compound, wherein the dicarboxylic acid contains an alicyclic dicarboxylic acid, and the dihydroxy compound contains a compound of the following general formula (1):

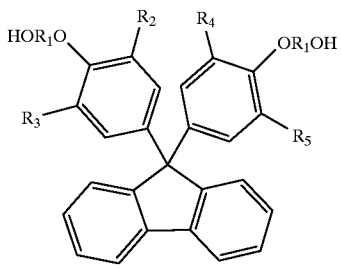

(1)

wherein $R_1$ represents an alkylene group having from 2 to 4 carbon atoms; and $R_2$, $R_3$, $R_4$ and $R_5$ each represents a hydrogen atom, an alkyl group having from 1 to 4 carbon atoms, an aryl group or an aralkyl group which may be the same or different.

2. A polyester polymer comprising a dicarboxylic acid or its ester-forming derivative and a dihydroxy compound, wherein the dicarboxylic acid contains an alicyclic dicarboxylic acid and an aromatic dicarboxylic acid, and the dihydroxy compound contains a compound of the following general formula (1):

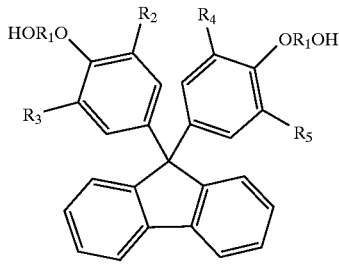

(1)

wherein $R_1$ represents an alkylene group having from 2 to 4 carbon atoms; and $R_2$, $R_3$, $R_4$ and $R_5$ each represents a hydrogen atom, an alkyl group having from 1 to 4 carbon atoms, an aryl group or an aralkyl group which may be the same or different.

3. The polyester polymer as claimed in claim 1, wherein the alicyclic dicarboxylic acid is at least one compound selected from cyclohexane-dicarboxylic acid, decalin-dicarboxylic acid, norbornane-dicarboxylic acid, adamantane-dicarboxylic acid and tricyclodecene-dicarboxylic acid.

4. The polyester polymer as claimed in claim 2, wherein the alicyclic dicarboxylic acid is at least one compound selected from cyclohexane-dicarboxylic acid, decalin-dicarboxylic acid, norbornane-dicarboxylic acid, adamantane-dicarboxylic acid and tricyclodecene-dicarboxylic acid.

5. The polyester polymer as claimed in claim 2, wherein the aromatic dicarboxylic acid is selected from terephthalic acid, isophthalic acid and their ester-forming derivatives.

6. The polyester polymer as claimed in claim 4, wherein the aromatic dicarboxylic acid is selected from terephthalic acid, isophthalic acid and their ester-forming derivatives.

7. The polyester polymer as claimed in claim 1, wherein the dihydroxy compound of formula (1) is 9,9-bis[4-(2-hydroxyethoxy)phenyl]fluorene.

8. The polyester polymer as claimed in claim 2, wherein the dihydroxy compound of formula (1) is 9,9-bis[4-(2-hydroxyethoxy)phenyl]fluorene.

9. The polyester polymer as claimed in claim 3, wherein the dihydroxy compound of formula (1) is 9,9-bis[4-(2-hydroxyethoxy)phenyl]fluorene.

10. The polyester polymer as claimed in claim 4, wherein the dihydroxy compound of formula (1) is 9,9-bis[4-(2-hydroxyethoxy)phenyl]fluorene.

11. The polyester polymer as claimed in claim 5, wherein the dihydroxy compound of formula (1) is 9,9-bis[4-(2-hydroxyethoxy)phenyl]fluorene.

12. An optical disc for reading and reproducing information, the optical disc comprised of the polyester polymer of claim 1.

13. An optical disc for reading and reproducing information, the optical disc comprised of the polyester polymer of claim 2.

14. An optical lens comprised of the polyester polymer of claim 1.

15. An optical lens comprised of the polyester polymer of claim 2.

16. An optical sheet comprised of the polyester polymer of claim 1.

17. An optical sheet comprised of the polyester polymer of claim 2.

18. An optical film comprised of the polyester polymer of claim 1.

19. An optical film comprised of the polyester polymer of claim 2.

20. An optical fiber comprised of the polyester polymer of claim 1.

21. An optical fiber comprised of the polyester polymer of claim 2.

22. The polyester polymer as claimed in claim 1, wherein the dicarboxylic acid contains about 20 mol % to about 99% of the alicyclic dicarboxylic acid.

23. The polyester polymer as claimed in claim 2, wherein the dicarboxylic acid contains about 20 mol % to about 99% of the alicyclic dicarboxylic acid.

* * * * *